United States Patent [19]

Sorli

[11] Patent Number: 4,568,167
[45] Date of Patent: Feb. 4, 1986

[54] FILM PROCESSING ROLLER ASSEMBLY

[75] Inventor: Duncan C. Sorli, Chelmsford, Mass.

[73] Assignee: Polaroid Corporation, Cambridge, Mass.

[21] Appl. No.: 644,361

[22] Filed: Aug. 27, 1984

[51] Int. Cl.$^4$ .......................... G03B 17/52; G03D 9/02
[52] U.S. Cl. ........................................ 354/304; 354/86
[58] Field of Search ........................ 354/84, 85, 86, 87, 354/304, 312

[56] References Cited

U.S. PATENT DOCUMENTS

| | | | |
|---|---|---|---|
| 2,477,304 | 7/1949 | Land | 354/304 |
| 3,318,221 | 5/1967 | Erikson | 354/304 |
| 3,730,065 | 5/1973 | Nesson et al. | 354/304 |
| 3,739,701 | 6/1973 | Erlichman | 354/86 |
| 3,745,904 | 7/1973 | Bing et al. | 354/304 |
| 3,777,647 | 12/1973 | Land | 354/304 |
| 3,854,812 | 12/1974 | Sorli | 354/312 |
| 3,882,518 | 5/1975 | Douglas | 354/86 |
| 3,999,202 | 12/1976 | Goto | 354/304 |
| 4,360,260 | 11/1982 | Eloranta et al. | 354/304 |

Primary Examiner—A. A. Mathews
Attorney, Agent, or Firm—Edward S. Roman

[57] ABSTRACT

A film processing roller assembly wherein the gap spacing between the film processing rollers is initially automatically increased to accommodate the insertion of a positive and negative film sheet in superimposed relationship with respect to each other together with a container of processing fluid disposed therebetween into the bite of the rollers. The gap spacing between the processing rollers is thereafter automatically reduced to a select value which may be manually adjusted prior to the processing operation to an optimum value for accommodating a uniform processing fluid spread characteristic. Edge control plates operate to maintain the film processing fluid within the confines of the film sheet during film processing and supplementary drive rollers operate advance the positive and negative film sheets through the selected gap of the processing rollers during the film processing cycle.

13 Claims, 5 Drawing Figures

FILM PROCESSING ROLLER ASSEMBLY

BACKGROUND OF THE INVENTION

1. Field of the Invention

This invention relates generally to a film processing roller assembly and, more particularly, to a film processing roller assembly in which the initial spacing between the processing rollers is adjusted to accommodate the insertion of a negative and positive film sheet with a pod of processing fluid therebetween within the bite of the rollers.

2. Description of the Prior Art

Photographic cameras of the self-developing type wherein a film unit comprising a positive and negative film sheet disposed in superimposed relationship with respect to each other are advanced through a pair of processing rollers for uniformly spreading a processing fluid between the positive and negative film sheets are well known in the art. The film processing roller assemblies for such self-developing cameras may include a means for initially releasably retaining the processing rollers in a predetermined spaced relationship to facilitate the reception of the exposed film unit for processing as disclosed in U.S. Pat. No. 3,739,701, entitled "Novel Photographic Camera Film Processing Means", by Irving Erlichman, issued June 19, 1973, in common assignment herewith. The means for releasing the processing rollers is thereafter disengaged to allow the processing rollers to resiliently close on the film unit and spread the processing fluid in a well-known manner. Other film processing roller assemblies embody another useful and important feature which allows the user to preset the gap or spacing between the processing rollers prior to processing the film unit as disclosed in U.S. Pat. No. 4,360,260, entitled "Spreader Roller System Having Adjustable Roller Gap", by Vaito Eloranta et al., issued Nov. 23, 1982, in common assignment herewith. However, such features have not been combined in a single film processing roller assembly so as to enable the user to both select the gap spacing between the processing rollers while at the same time allowing for an initial increase in the spacing between the processing rollers to accommodate the initial receipt of the film sheets into the bite of the rollers and still maintain edge control of the film processing fluid as it is spread between a pair of positive and negative film sheets.

Therefore, it is a primary object of this invention to provide a film processing roller assembly in which the gap spacing between the processing rollers is initially automatically increased to accommodate the reception of both a positive and negative film sheet in superimposed relationship with respect to each other and thereafter decreased to a selected roller gap spacing to assure the uniform spread of the processing fluid between the positive and negative film sheets.

Other objects of the invention will be in part obvious and will in part appear hereinafter. The invention accordingly comprises a mechanism and system possessing the construction, combination of elements, and arrangement of parts which are exemplified in the following detailed disclosure.

SUMMARY OF THE INVENTION

A film processing roller assembly is provided wherein the initial spacing between the processing rollers may be temporarily increased to accommodate the insertion of a positive and negative film sheet therebetween. There is also provided a wedge control assembly having top and bottom edge control plates for engaging respective edges of the film sheets so as to maintain the film processing fluid within the confines of the film sheet. Means are also provided for temporarily increasing the spacing between the top and bottom edge control plates to accommodate the initial insertion of the edges of the film sheets therebetween. In addition, there are provided means in the form of fixed and adjustable wedges for preadjusting a selected spacing between the processing rollers which is effective during the remainder of the processing cycle to achieve the desired spread characteristic of the processing fluid between the positive and negative film sheets. In addition, supplementary drive rollers are provided to advance the positive film sheet and its accompanying negative film sheet through the film processing rollers during the processing cycle subsequent to the rollers being returned to their selected gap spacing.

DESCRIPTION OF THE DRAWINGS

The novel features that are considered characteristic of the invention are set forth with particularity in the appended claims. The invention itself both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
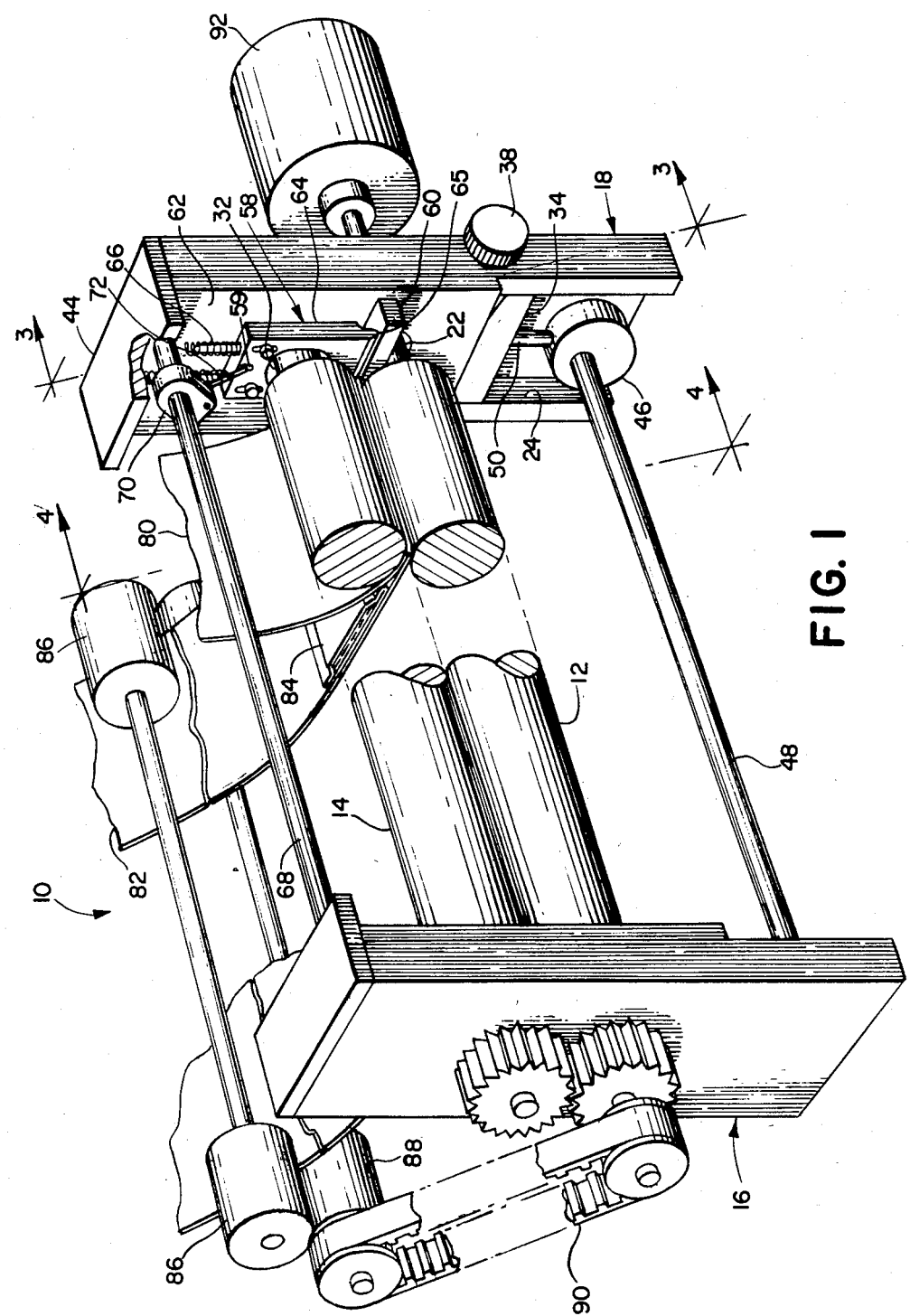
FIG. 1 is a partial perspective of the film processing roller assembly of this invention.
Figure 2:
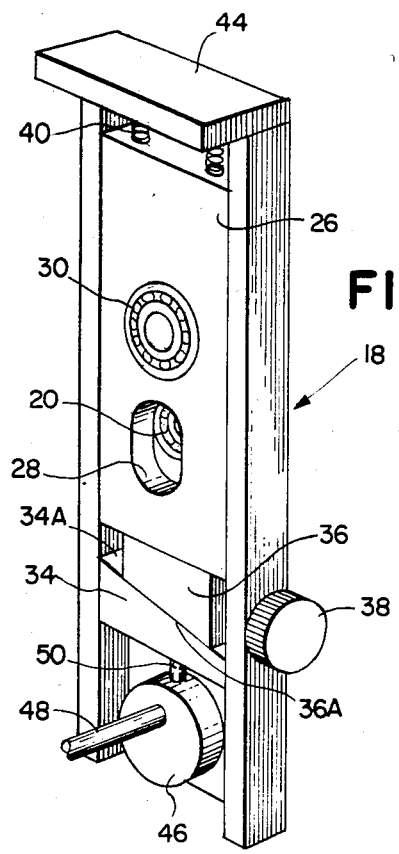
FIG. 2 is a cross-sectional perspective taken along the lines 2—2 of FIG. 1.

Referring now to FIG. 1, there is shown at 10 the film processing roller assembly of this invention comprising a frame having a pair of upright end block portions 16 and 18. Each of the end blocks, as for example, the end block 18 as shown in FIGS. 2-5 has a bearing 20 for journaling a shaft 22 which extends laterally outward from a first or lower film processing roller 12. The end block 18 also has a slotted recess 24 within which a slide block 26 is slidably disposed. The slide block 26 has an elongated opening 28 therethrough to provide clearance with respect to the shaft 22 in a manner as will become apparent from the following discussion. The slide block 26 also includes a bearing 30 for journaling a shaft 32 which extends laterally outward from the end of a second (or upper) processing roller 14. A fixed wedge 34 is mounted within the end block 18, transversely of the slotted recess 24, and includes a tapered upper surface 34A which cooperates with a lower tapered surface 36A of an adjustable or movable wedge 36. The adjustable wedge 36 may be moved transversely of the end block 18 by an adjusting thumb screw 38 so as to raise or lower the slide block 26 on which the upper roller is rotatably mounted. With tis arrangement, the initial separation between the cooperating processing rollers 12 and 14 may be suitably adjusted.

The slide block 26 is biased generally by a pair of coil compression springs 40 or other suitable resilient biasing means. The springs 40 are piloted in respective blind bores 42 formed in the top of the slide block 26 and are retained by a rectangular cap 44 suitably secured to the top of the upright end block 18. An eccentric cam 46 carried by a shaft 48 is disposed within the end block 18 for engagement with a cam follower 50. The cam follower 50 is preferably in the form of a round bar which passes through a circular opening 52 in the fixed wedge 34 and a slotted opening 54 in the adjustable wedge 36. The top portion of the cam follower 50 is piloted within a blind bore 56 formed in the lower portion of the slide block 26.

Figure 3:
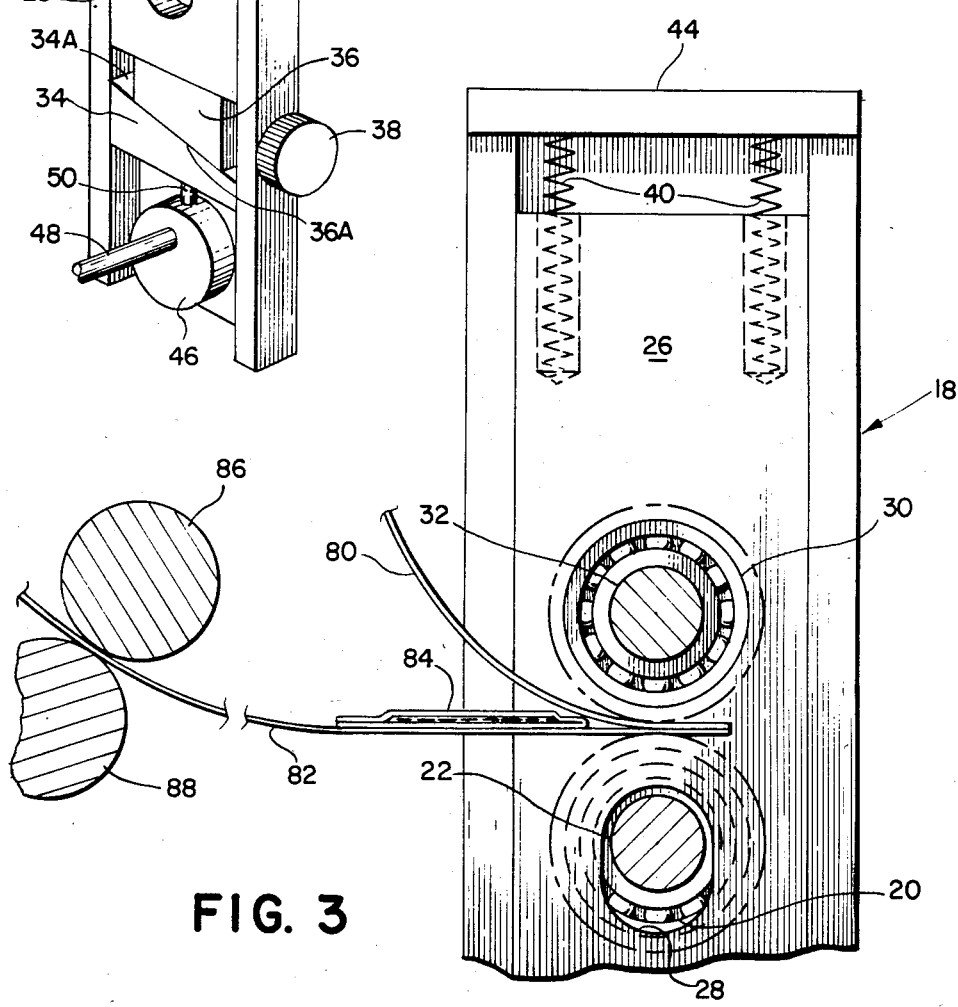
FIG. 3 is a cross-sectional view taken along the lines 3—3 of FIG. 1.
Figures 4, 5:
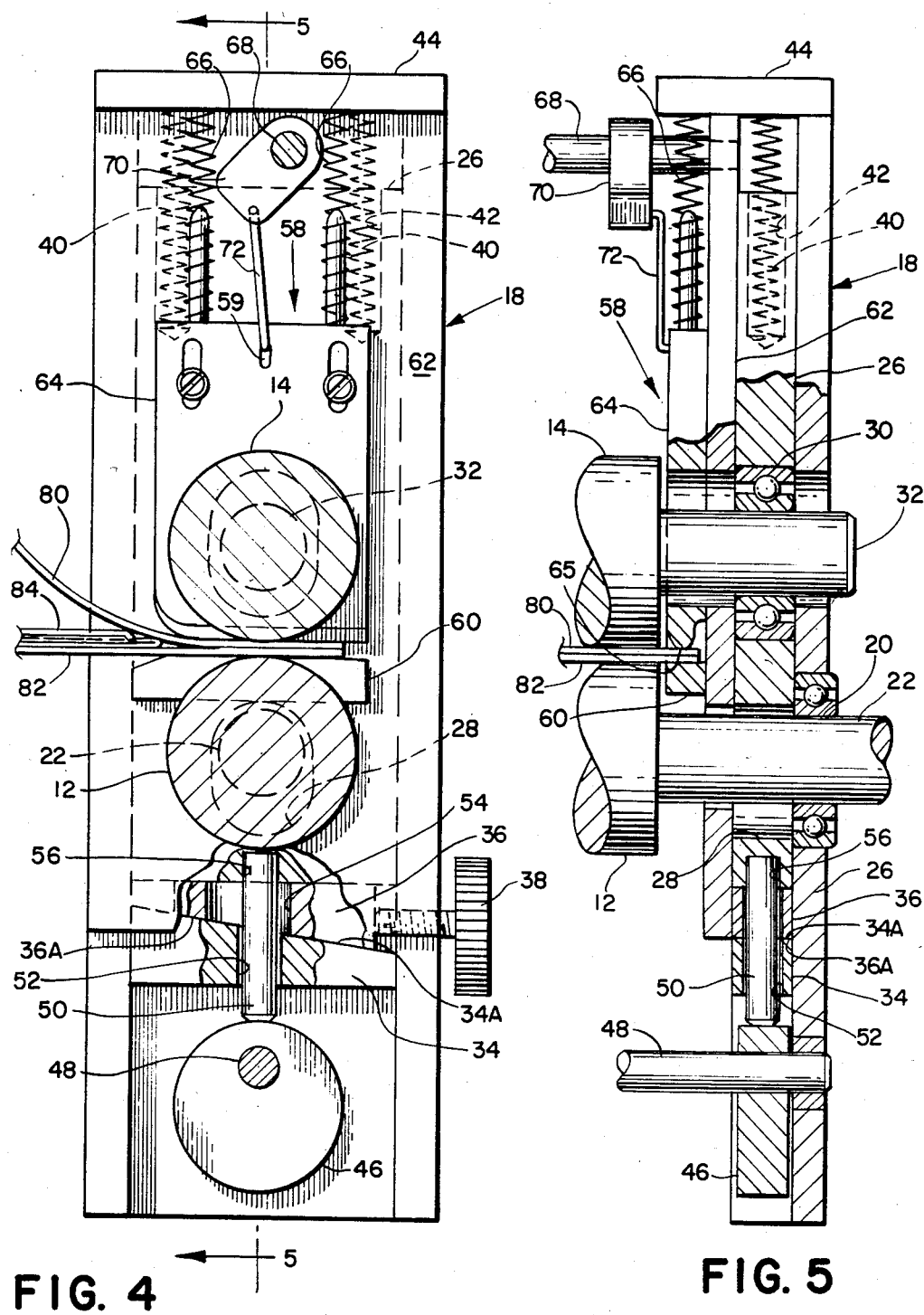
FIG. 4 is a cross-sectional view taken along the lines 4—4 of FIG. 1.
FIG. 5 is a cross-sectional view taken along the lines 5—5 of FIG. 4.

An edge control assembly as shown generally at 58 FIGS. 1 and 3 is provided to confine the spread of the film processing fluid within the borders of the film sheet in a manner as will be subsequently described herein. The edge control assembly 58 comprises a bottom edge control plate 60 fixedly connected to a side cover 62 which covers the open side of the upright end block portion 18. A top edge control plate 64 is slidably mounted by suitable means to the side cover 62 so as to accommodate vertical sliding displacement thereof. A bottom surface of the top edge control plate 64 is suitably rounded or tapered as shown at 65 so as to engage the top surface of the bottom edge control plate 60 along a line which intersects the top of the film processing rollers 12. The top edge control plate 64 is resiliently biased to move downward toward the bottom edge control plate 60 by a pair of compression springs 66 suitably mounted between the top surface of the top edge control plate 64 and the underlying surface of the rectangular cap 44. Means are provided for vertically raising the top edge control plate 64 in the form of an overhead drive shaft 68 rotatably mounted between the upright end block portions 16 and 18. An integral bell crank 70 extends laterally outward from the overhead drive shaft 68 for connection to the top edge control plate 64 by way of an interconnecting rod 72. Thus, as is now readily apparent, rotation of the overhead drive shaft 68 operates to rotate the bell crank 70 in a manner operating to vertically displace the connecting rod 72 and its accompanying top edge control plate 64.

Operation of the film processing roller assembly of this invention commences by rotating the shaft 48 so as to rotate the eccentric cam 46 in a manner so as to raise the cam follower 50 and thereby raise the slide block 26 within the slotted recess 24 in the end block 18. This action, in turn, operates to raise the bearing 30, the shaft 32 and the upper roller 12. As a result, the distance or gap between the cooperating processing rollers 12 and 14 is initially increased to accommodate receipt of a negative film sheet as shown at 82 in the manner of this invention to be now described. A positive film sheet 80 is preferably withdrawn from a roll of positive film sheet material (not shown) by a pair of juxtaposed drive rollers 86 and 88 which are in common drive with the film processing rollers 12 and 14 by means of a motor 92, and interconnecting drive belt 90 as best shown in FIG. 1. The positive film sheet 80 is preferably advanced by the drive rollers 86 and 88 into position between the film processing rollers 12 and 14 which as previously discussed are first moved to their widened gap position.

As will be readily understood, prior to the insertion of the positive film sheet 80 between the film processing rollers 12 and 14, the edge control assembly 58 is also actuated by the rotation of the overhead drive shaft 68 to vertically raise the top edge control plate 64 thereby leaving a widened gap between the rounded bottom surface 65 and the top surface of the bottom edge control plate 60 so as to accommodate the insertion of the positive and negative film sheets therebetween.

After the positive film sheet 80 is inserted in the aforementioned manner, the exposed negative film sheet which, as will be readily understood, may be exposed in any conventional manner is driven by suitable means so that the leading edge thereof engages the top surface of the positive film sheet 80 and is deflected thereby so as to advance into the widened gap of the film processing rollers 12 and 14. The drive shaft 48 is next rotated so as to rotate the eccentric cam 46 into position lowering the cam follower 50 and ultimately disengaging therefrom thereby, in turn, lowering the slide block 26 so as to lower the upper film processing roller 12 into its previously selected gap defining position. A rupturable pod or container of film processing fluid as shown generally at 84 is next inserted in any well-known manner, such as by hand, between the positive and negative film sheets immediately adjacent the line of convergence. The overhead drive shaft 68 is thereafter rotated so that the bell crank 70 and its accompanying connecting rod 72 slide downwardly along an elongated slot 59 to allow the top edge control plate 64 to be resiliently biased downwardly into engagement with the top edge of the negative film sheet 82. As will be readily understood, the bottom edge of the underlying positive film sheet is engagingly supported by the top surface of the bottom edge control plate 60, and in this manner the edges of the negative and positive film sheets are squeezed together between the bottom and top edge control plates respectively to prevent the film processing fluid from leaking therebetween.

The film processing rollers 12 and 14 are next rotatably driven in concert with the drive rollers 86 and 88 to advance the positive and negative film sheets 80 and 82 in superposition with respect to each other with the pod 84 of rupturable film processing fluid therebetween through the processing rollers 12 and 14. Since the processing rollers 12 and 14 are set to a predetermined gap in the aforementioned manner, there is not provided sufficient frictional engagement with the film sheets 80, 82 to initially advance the film sheets through the processing rollers without the film advancing impetus initially provided by the drive rollers 86 and 88. However, once the forward movement of the film sheets through the processing rollers is started, it will be understood that the processing rollers may operate to provide the film advancing impetus in which case the drive rollers 86, 88 freewheel. Toward this end the diameter of the drive rollers 86, 88 is preferably made smaller than the diameter of the film processing rollers. The film processing rollers 12 and 14 operate to rupture the pod 84 of film processing fluid as it is advanced therebetween and to spread the processing fluid between the negative and positive film sheets in the usual manner to effect a transfer of the image to the positive film sheet. As previously discussed, the film processing fluid is maintained within the confines of the positive and negative film sheets 80, 82 by the coaction of the top and bottom edge control plates 64 and 60 squeezing the edges of the positive and negative film sheets.

Upon completion of film processing, the spacing between the processing rollers 12, 14 is again increased, and the edge control plates 64, 60 are again opened in the aforementioned manner. The drive rolls 86, 88 thereafter operate to advance the film sheets so as to carry any excess processing fluid past the processing rollers 12, 14. A rotary knife (not shown) or any other conventional cutting apparatus may be provided to cut off and separate the processed part of the film sheets from that part of the film sheets between which the excess processing fluid is carried.

Thus, there is provided a film processing roller assembly wherein the initial spacing between the processing rollers may be temporarily increased to accommodate the insertion of a positive and negative film sheet therebetween. There is also provided an edge control assembly having top and bottom edge control plates for engaging respective edges of the film sheets so as to maintain the film processing fluid within the confines of the film sheet. Means are also provided for temporarily increasing the spacing between the top and bottom edge control plates to accommodate the initial insertion of the edges of the film sheets therebetween. In addition, there are provided means in the form of fixed and adjustable wedges for preadjusting a selected spacing between the processing rollers which is effective during the remainder of the processing cycle to achieve the desired spread characteristic of the processing fluid between the positive and negative film sheets. In addition, supplementary drive rollers are provided to advance the positive film sheet and its accompanying negative film sheet through the film processing rollers during the processing cycle subsequent to the rollers being returned to their selected gap spacing.

As will be readily understood, the film processing roller assembly 10 of this invention may be utilized in a variety of film processing applications wherein the negative and positive film sheets may be either discrete film units sequentially fed into the bite of the processing rollers or portions of a continuous roll of positive and negative film sheet material fed into the bite of the processing rollers and thereafter cut by means (not shown) into discrete film sections. In addition, the film processing roller assembly 10 of this invention may be utilized at the film processing station in any of a variety of self-developing type cameras or film processors such as that disclosed in U.S. Pat. No. 3,854,812, entitled "Photographic Processor For Large Format Film Units", by Duncan Sorli, issued Dec. 17, 1974, in common assignment herewith and now incorporated by reference herein.

Other embodiments of the invention including additions, subtractions, deletions and other modifications of the preferred disclosed embodiments of the invention will be obvious to those skilled in the art and are within the scope of the following claims.

What is claimed is:

1. A film processing roller assembly for processing a positive film sheet to print an image thereon from an exposed negative film sheet, said assembly comprising:
a pair of cooperating film processing rollers for receiving the positive and negative sheets in substantially superimposed relationship to each other with a rupturable fluid container therebetween;
a frame member;
first bearing means fixedly disposed with respect to said frame member for rotatably supporting a first one of the processing rollers;
a pair of spaced apart slide blocks slidably disposed with respect to said frame member and including second bearing means for rotatably supporting a second one of said processing rollers;
resilient biasing means for yieldably urging said slide blocks to slide in one direction so that said second processing roller moves toward said first processing roller; and
eccentric cam means operatively connecting said slide blocks for sliding said slide blocks in another direction opposite to said one direction and against the yieldable urging of said biasing means so that said second processing roller moves away from said first processing roller thereby temporarily increasing the distance between said processing rollers to accommodate the initial insertion of the positive and negative film sheets therebetween.

2. The film processing roller assembly of claim 1 wherein each of said slide blocks includes an elongated opening through which the first processing roller extends thereby accommodating the sliding movement of said slide blocks past the first processing roller.

3. The film processing roller assembly of claim 1 including cam followers for operatively connecting said slide blocks respectively with said eccentric cam means.

4. The film processing roller assembly of claim 3 including a pair of first wedges fixedly connected with respect to said frame member and a pair of second wedges slidably engaged with respective ones of said first wedges and operatively connected respectively to said slide blocks such that sliding movement of said second wedges with respect to said first wedges operates to slidably displace said slide blocks relative to said frame member in order to accommodate the adjustment of the initial spacing between the processing rollers.

5. The film processing roller assembly of claim 4 wherein each of said fixed wedges has a circular opening therethrough and each of said slidable wedges has a slotted opening therethrough and wherein said cam follower passes through the respective openings in said wedges.

6. The film processing roller assembly of claim 1 including edge control means for confining the spread of the film processing fluid from the rupturable fluid container between the negative and positive film sheets, said edge control means comprising bottom edge control plates for engaging respective bottom edges of the bottom one of the positive and negative film sheets and top edge control plates resiliently biased toward respective bottom edge control plates for engaging respective top edges of the top one of the positive and negative film sheets so as to squeeze the respective edges of the positive and negative film sheets together and thereby limit the spread of the processing fluid to the confines of the film sheets as the film sheets are advanced through said processing rollers.

7. The film processing roller assembly of claim 6 wherein said top edge control plate is slidably disposed for movement between a first position when it is spaced apart from said bottom edge control plate to permit the advancement of the respective edges of the film sheets therebetween and a second position wherein it is resiliently biased toward said bottom edge control plate so as to squeeze the respective edges of the positive and negative film sheets together.

8. The film processing roller assembly of claim 1 including a pair of juxtaposed drive rollers for drivingly engaging one of the positive and negative film sheets in order to initially advance the film sheets through said processing rollers during the processing of the film sheets, said drive rollers being rotatably driven in common with said processing rollers.

9. A film processing system for processing a positive film sheet to print an image thereon from an exposed negative film sheet by the spreading of a film processing fluid therebetween, said system comprising:

a pair of cooperating film processing rollers;

a pair of juxtaposed drive rollers connected to be rotatably driven in common with said processing rollers for initially advancing a positive and negative film sheet in superimposed relationship with respect to each other toward and through said processing rollers in order to spread a film processing fluid between the film sheets; and means for rotatably supporting said processing rollers and adjusting the distance between said processing rollers to a select gap in order to provide a desired processing fluid spread characteristic as the film sheets are advanced by said drive rollers through said processing rollers, said support means also including means for temporarily increasing the distance between said processing rollers to accommodate the initial insertion of the positive and negative film sheets therebetween, subsequent to which the distance between said processing rollers is returned to said select gap.

10. The film processing system of claim 9 including edge control means for confining the spread of a film processing fluid between the negative and positive film sheets wherein said edge control means comprises bottom edge control plates for engaging respective bottom edges of the bottom one of the positive and negative film sheets and top edge control plates resiliently biased toward respective bottom edge control plates for engaging respective top edges of the top one of the positive and negative film sheets so as to squeeze the respective edges of the positive and negative film sheets together and thereby limit the spread of the processing fluid to the confines of the film sheets as the film sheets are advanced through said processing rollers.

11. The film processing system of claim 10 wherein said top edge control plate is slidably disposed for movement between a first position wherein it is spaced apart from said bottom edge control plate to permit the advancement of the respective edges of the film sheets therebetween and a second position wherein it is resiliently biased toward said bottom edge control plate so as to squeeze the respective edges of the positive and negative film sheets together.

12. A film processing system for processing a positive film sheet to print an image thereon from an exposed negative film sheet by the spreading of a film processing fluid therebetween, said system comprising:

a pair of cooperating film processing rollers;

means for rotatably supporting said processing rollers and adjusting the distance between said processing rollers to a select gap in order to provide a desired processing fluid spread characteristic as the film sheets are advanced through said processing rollers, said support means also including means for temporarily increasing the distance between said processing rollers to accommodate the initial insertion of the positive and negative film sheets therebetween, subsequent to which the distance between said processing rollers is returned to said select gap; and edge control means for confining the spread of the film processing fluid between the negative and positive film sheets, said edge control means comprising bottom edge control plates for engaging respective bottom edges of the bottom one of the positive and negative film sheets and top edge control plates resiliently biased toward respective bottom edge control plates for engaging respective top edges of the top one of the positive and negative film sheets so as to squeeze the respective edges of the positive and negative film sheets together and thereby limit the spread of the processing fluid to the confines of the film sheets as the film sheets are advanced through said processing rollers.

13. The film processing system of claim 12 wherein said top edge control plate is slidably disposed for movement between a first position wherein it is spaced apart from said bottom edge control plate to permit the advancement of the respective edges of the film sheets therebetween and a second position wherein it is resiliently biased toward said bottom edge control plate so as to squeeze the respective edges of the positive and negative film sheets together.

* * * * *